United States Patent [19]

List et al.

[11] Patent Number: 4,879,104

[45] Date of Patent: Nov. 7, 1989

[54] PROCESS FOR PRODUCING CARBON BLACK

[75] Inventors: Steven J. List, Billerica, Mass.; Ronald C. Hurst, Pampa, Tex.

[73] Assignee: Cabot Corporation, Waltham, Mass.

[21] Appl. No.: 63,187

[22] Filed: Jun. 16, 1987

[51] Int. Cl.⁴ .............................................. C01B 31/02
[52] U.S. Cl. .................................. 423/450; 423/456; 423/457; 422/156
[58] Field of Search .................. 423/447.6, 445, 450, 423/451, 456, 460, 447.8; 422/156, 151

[56] References Cited

U.S. PATENT DOCUMENTS

| Re. 28,974 | 9/1976 | Morgan et al. | 423/450 |
|---|---|---|---|
| 3,877,876 | 4/1975 | Cheng | 423/456 |
| 4,058,590 | 11/1977 | Ruble | 423/449 |
| 4,213,939 | 7/1980 | Ruble | 422/156 |
| 4,216,193 | 8/1980 | Vanderveen | 423/450 |
| 4,283,378 | 8/1981 | Yates et al. | 423/456 |
| 4,339,422 | 7/1982 | Cheng | 423/450 |
| 4,402,929 | 9/1983 | Hunt | 423/450 |
| 4,447,401 | 5/1984 | Casperson | 423/450 |
| 4,643,880 | 2/1987 | King et al. | 422/156 |
| 4,664,901 | 5/1987 | Henderson | 423/457 |
| 4,692,312 | 9/1987 | Dilbert et al. | 422/151 |

*Primary Examiner*—Anthony McFarlane
*Attorney, Agent, or Firm*—Lawrence A. Chaletsky

[57] ABSTRACT

Disclosed is a process for producing carbon blacks which for a given surface area are characterized by having lower tinting strength and higher structure.

10 Claims, 2 Drawing Sheets

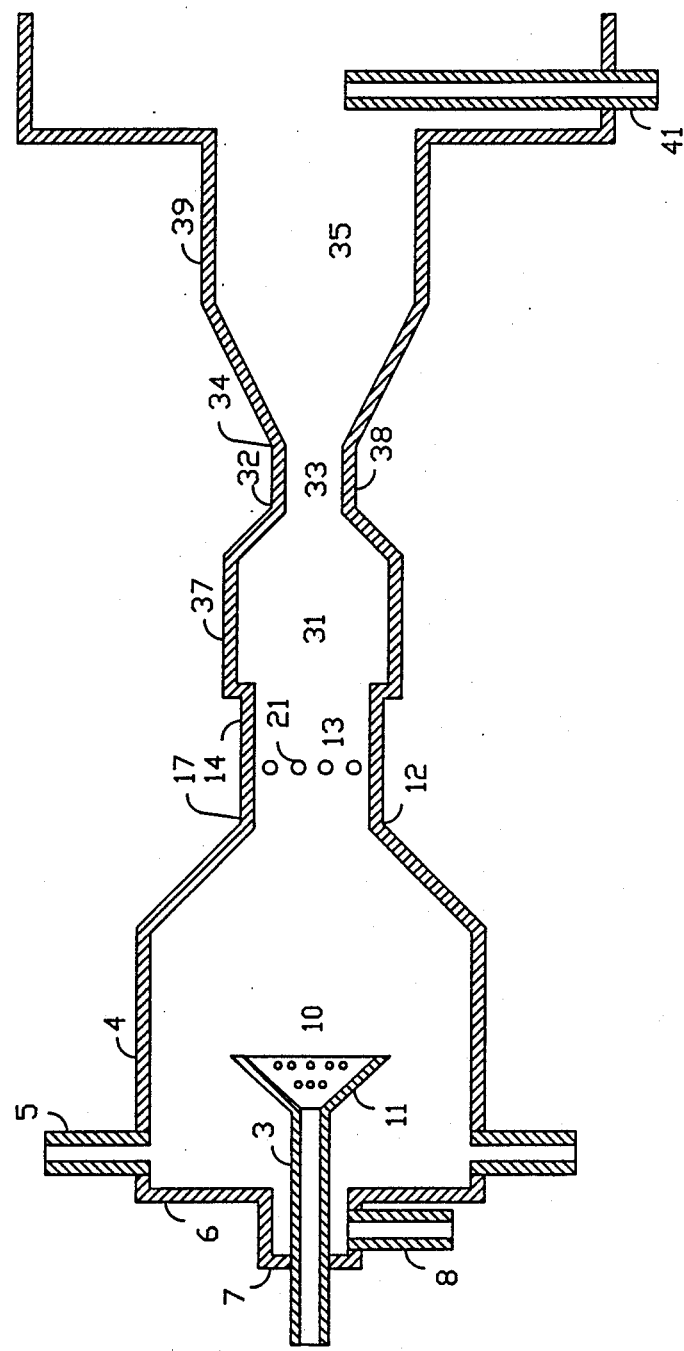

PROCESS FOR PRODUCING CARBON BLACK

BACKGROUND OF THE INVENTION

Carbon black is produced by the incomplete combustion of a hydrocarbon such as petroleum, natural gas and other well-known materials at high temperatures. When separated from the reaction gases, the product is a fluffy, carbon black powder.

Carbon black can be produced using a modular or staged process such as for example the type disclosed and claimed in U.S. Pat. No. Re. 28,974. A staged process is comprised of a primary (first-stage) combustion zone wherein a stream of hot gaseous combustion products is formed; a second or transition zone wherein a liquid hydrocarbon feedstock either in pre-atomized form, or in the form of non-preatomized coherent streams, is injected substantially radially from the outer or inner periphery of the combustion gas stream into the pre-formed stream of hot combustion gases; and a third zone (the reaction zone) wherein the carbon black formation occurs prior to termination of the reaction by quenching.

There are instances, however, where it is desired to produce carbon blacks which for a given surface area are characterized by having lower tinting strength and higher structure. The blacks are useful in preparing rubber compounds having increased modulus and rebound values.

Accordingly, the primary object of the invention is to provide a novel and improved process for preparing carbon blacks which for a given surface area are characterized by having lower tinting strength and higher structure.

Other and different objects, advantages and features of the present invention will become apparent to those skilled in the art upon consideration of the following detailed description and claims.

SUMMARY OF THE INVENTION

The process of the present invention involves forming a hot combustion gas stream by reacting a fuel with an oxidant in a first or primary combustion zone. The gauge pressure, or pressure above ambient conditions, within the combustion zone is at least 2.0 inches (51 mm) of mercury. Preferably, the gauge pressure within the combustion zone should be at least 6.0 inches (152 mm) of mercury and still more preferably above 10.0 inches (254 mm) of mercury. Feedstock is then injected into the hot combustion gas stream either substantially radially or axially. Preferably, the feedstock is injected into the combustion gas stream in the form of non-preatomized coherent streams radially inwardly or outwardly from the inner and/or outer periphery of the combustion gas stream. It is also possible where feedstock is injected from both the outer and inner periphery of the combustion gas stream for the feedstock to be injected in a preatomized form from one periphery and in a non-preatomized form from the other periphery.

Subsequent to the injection of feedstock into the combustion gas stream, the combustion gas stream containing the feedstock flows through the transition zone into a first reaction zone having an internal cross-sectional area larger than that of the transition zone. Preferably, the ratio of the internal cross-sectional area of the first reaction zone to that of the transition zone is between 1.1 and 4.0. From the first reaction zone the combustion gas stream flows into a throat zone having an internal cross-sectional area smaller than that of the transition zone. Preferably, the ratio of the internal cross-sectional area of the throat zone to that of the transition zone is between about 0.25 and 0.9.

From the throat zone, the combustion gas stream containing the feedstock flows into a second reaction zone having an internal cross-sectional area larger than that of the throat zone. Preferably, the ratio of the internal cross-sectional area of the second reaction zone to that of the transition zone is between about 1.1 and 16.0. Thereafter, within the second reaction zone the carbon forming process is terminated by the injection of a quench medium such as water.

BRIEF DESCRIPTION OF THE DRAWINGS

FIG. 2 is a schematic, diagrammatic, longitudinal, sectional view of a typical carbon black-producing furnace which was utilized in Examples 2 and 4.

Figure 1:
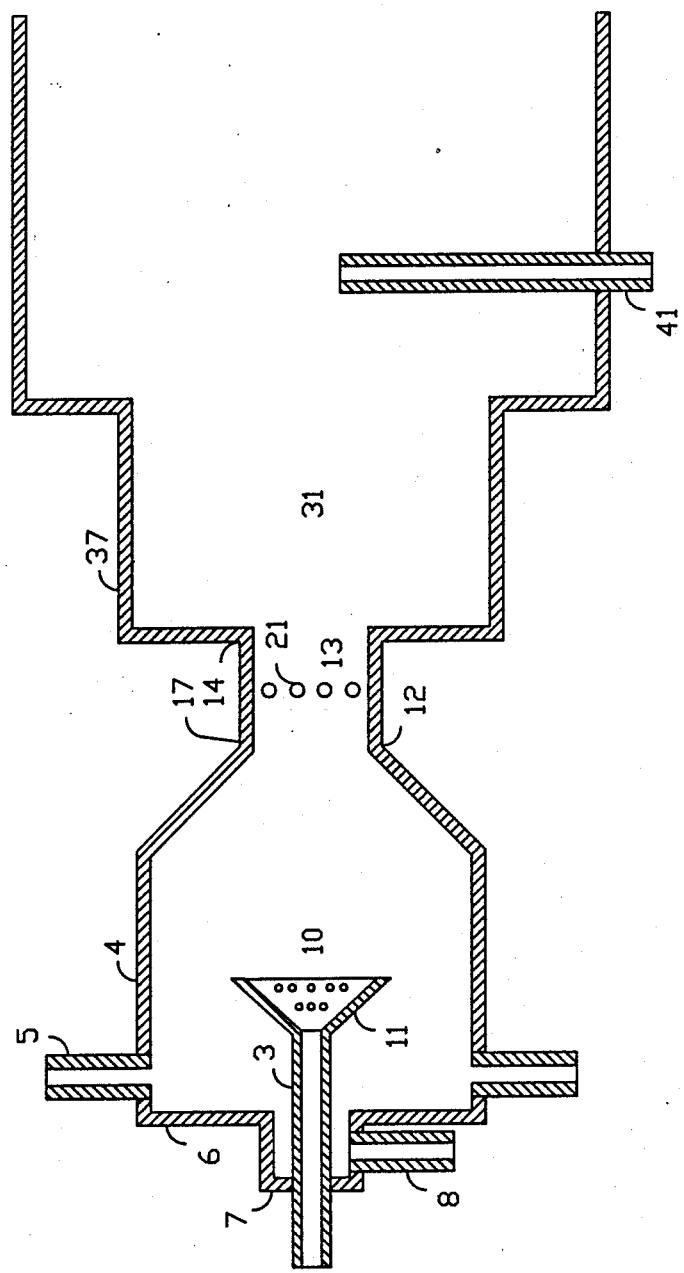
FIG. 1 is a schematic, diagrammatic, longitudinal, sectional view of a typical carbon black-producing furnace which was utilized in Examples 1 and 3.

The following is a detailed description of the furnace shown in FIG. 2 which was utilized in carrying out the process of the present invention.

Referring to FIG. 2, there is shown a furnace 1 which is comprised of 5 zones, a primary combustion zone 10, a transition zone 13, a first reaction zone 31, a throat zone 33, and a second reaction zone 35 into which quench probe 41 is placed to terminate the carbon black forming reaction.

Combustion zone 10 is defined by upstream wall 6 and side wall 4, and terminates at point 12 which is the beginning of transition zone 13. Through wall 6 is inserted conduit 8 through which fuel is introduced into combustion zone 10. Through side wall 4 is inserted conduit 5 through which an oxidant is introduced into combustion zone 10. Contained within combustion zone 10 is flame holder 11 which is attached to pipe 3 which is inserted into combustion zone 10 through orifice 7 in wall 6. Downstream of and connected to combustion zone 10 is transition zone 13 which is defined by wall 17 which begins at point 12 and terminates at point 14. Circumferentially located around wall 17 are a plurality of substantially radially oriented, orifices 21 through which feedstock may be injected into transition zone 13.

Downstream of and connected to transition zone 13 is first reaction zone 31 which is defined by wall 37. Zone 31 can be of variable length and width depending upon the reaction conditions desired. However, the interior cross-sectional area of first reaction zone 31 must be larger than that of transition zone 13. Preferably, the ratio of of the internal cross-sectional area of the first reaction zone to that of the transition zone is between 1.1 and 4.0. Wall 37 then converges at a 45° angle relative to the center line of furnace 1 and leads into wall 38 at point 32. Wall 38 defines throat zone 33. The internal cross-sectional area of throat zone 33 is less than the internal cross-sectional area of transition zone 13. Preferably, the ratio of the internal cross-sectional area of throat zone 33 to the internal cross-sectional area of transition zone 13 is between about 0.25 and 0.9. The downstream end 34 of wall 38 leads into wall 39. Wall 39 diverges at a 30° angle relative to the center line of furnace 1 and defines second reaction zone 35. The internal cross-sectional area of second reaction zone 35 is larger than the internal cross-sectional area of throat zone 33. Preferably the ratio of the internal cross-sectional area of second reaction zone 35 to that of transition zone 13 is between about 1.1 and 16.0. Through wall 39 into second reaction zone 35 is placed quench probe 41 through which a quench medium such as water may be injected in order to terminate the carbon black forming reaction.

In general, the process of the present invention for producing carbon blacks of a given surface area which are characterized by lower tint and higher structure is achieved as follows.

Into a combustion zone there is introduced through a conduit a suitable fuel and through another conduit a suitable oxidant such as air, oxygen, mixtures of air and oxygen, or the like. Among the fuels suitable for use in the reaction with the oxidant stream in a combustion chamber to generate the hot combustion gases are included any readily combustible matter whether in gaseous, varporous or liquid form such as hydrogen, carbon monoxide, methane, acetylene, alcohols, kerosene, liquid hydrocarbon fuels and the like. It is generally preferred to utilize hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane, butane, pentane fractions, fuel oils and the like.

As referred to herein, the primary combustion represents the amount of oxidant present in the first stage of the modular process divided by the amount of oxidant theoretically required for the complete combustion of the hydrocarbon present in the first stage of the process to form carbon dioxide and water, multiplied by 100 to give a percentage. The primary combustion may range from 100 to 500%. In this manner there is generated a stream of hot combustion gases flowing at a high velocity.

The gauge pressure wihin the combustion zone is at least 2.0 inches (51 mm) of mercury. It has furthermore been found that the gauge pressure within the combustion zone should preferably be at least 6.0 inches (152 mm) of mercury and still more preferably above 10.0 inches (254 mm) of mercury. Under these conditions, there is produced a stream of gaseous combustion products possessing sufficient energy to convert a carbon black-yielding hydrocarbonaceous, preferably liquid, feedstock into the desired carbon black products. The resultant combustion gases emanating from the combustion stage attain a temperature of at least about 2400° F. (1316° C.) with the most preferred temperature being at least above about 3000° F. (1649° C.).

The hot combustion gases are discharged from the downstream end of the combustion zone at a high velocity which is accelerated by passing the combustion gases through a transition zone of smaller internal cross-sectional area.

Feedstock is injected into the combustion gas stream, preferably at the mid-point of the transition zone. Furthermore, preferably, the feedstock is injected in the form of a plurality of non-preatomized coherent streams in a direction substantially radial to the flow of the combustion gas stream either from the outer or inner periphery thereof, through a plurality of orifices. Feedstock may also be injected both at the midpoint of the transition zone and upstream of the midpoint of the transition zone. Suitable for use herein as hydrocarbon feedstocks are unsaturated hydrocarbons such as acetylene; olefins such as ethylene, propylene and butylene; aromatics such as benzene, toluene and oxylene; certain saturated hydrocarbons and volatilized hydrocarbons such as kerosenes, naphthalenes, terpenes, ethylene tars, aromatic cycle stocks and the like. With respect to the above injections of feedstock at the defined locations, the feedstock may be the same or different.

The amounts of feedstock, fuel, and oxidant employed herein will be adjusted so as to result in an overall percent combustion ranging from about 15 to about 60 percent and preferably from about 25 to about 40 percent. The overall combustion represents the total amount of oxidant used in the carbon forming process divided by the amount of oxidant required for the complete combustion of the total amount of hydrocarbon present in the carbon forming process so as to yield carbon dioxide and water, multiplied by 100 in order to arrive at a percentage.

From the transition zone the hot combustion gas stream containing the feedstock flows into a first reaction zone which has an internal cross-sectional area larger than that of the transition zone, preferably the ratio being between about 1.1 and 4.0. The hot combustion gas stream containing the feedstock then flows into a throat zone. The internal cross-sectional area of the throat zone is smaller than the internal cross-sectional area of the transition zone. Preferably the ratio of the internal cross-sectional area of the throat zone to that of the transtion zone is between about 0.25 and 0.9.

From the throat zone the hot combustion gas stream containing feedstock flows into a second reaction zone. The internal cross-sectional area of the second reaction zone is larger than the internal cross-sectional area of the throat zone. Preferably, the internal cross-sectional area of the second reaction zone is larger than that of the transition zone, the ratio preferably being between 1.1 and 16.0.

Sufficient residence time within the second reaction zone is provided to allow the carbon black forming reactions to occur prior to the termination of the reaction by quenching. An exemplary manner of quenching is accomplished by injecting water through a quench nozzle. However, there are many other methods known in the art for quenching the carbon black forming process. The hot effluent gases containing the carbon black products suspended therein are then subjected to the conventional steps of cooling, separation and collection of carbon black. The separation of the carbon black from the gas stream is readily accomplished by any conventional means such as a precipitator, cyclone separator, bag filter, or combination thereof.

The following test procedures are used in determining the analytical properties of the blacks produced by the present invention.

IODINE ADSORPTION NUMBER

This is determined in accordance with ASTM D-1510-81.

TINT STRENGTH

This is determined in accordance with ASTM D-3265-80.

DIBUTYL PHTHALATE (DBP) ABSORPTION

This is determined in accordance with ASTM D-2414-82. The results reported indicate whether the carbon black is in fluffy or pellet form.

CRUSHED DBP ABSORPTION NUMBER (CDBP)

This is determined in accordance with ASTM D-3493-82.

Rubber Compounds

In evaluating the performance of the carbon blacks of the present invention, the following formulations are utilized wherein the quantities are specified in parts by weight.

TABLE 1

RUBBER FORMULATIONS

| Ingredient | ASTM-D-3192-79 Formulation A Natural Rubber Recipe Parts by Weight | ASTM-D-3191-82 Formulation B Synthetic Rubber Recipe Parts by Weight |
| --- | --- | --- |
| Polymer | (Natural rubber) 100 | (SBR1500-23.5% styrene, 76.5% butadiene) 100 |
| Zinc Oxide | 5 | 3 |
| Sulfur | 2.5 | 1.75 |
| Stearic Acid | 3 | 1 |
| Mercaptobenzo-thiazyl disulfide | 0.6 | — |
| N—tert-butyl-2, benzo-thiazole sulfenamide | — | 1 |
| Carbon Black | 50 | 50 |

The following test procedures are used to determine the physical properties of a rubber compound containing carbon black produced by the process of the present invention.

MODULUS AND TENSILE

Modulus and tensile properties are determined in accordance with the procedures described in ASTM D-412-80.

REBOUND

This is determined in accordance with the procedure set forth in ASTM D-1054-79.

The process of the present invention for producing carbon black having lower tint values and higher structure will be more readily understood by reference to the following examples. There are, of course, many other embodiments of this invention which will become obvious to one skilled in the art once the invention has been fully disclosed and it will accordingly be recognized that the following examples are given for the purpose of illustration only, and are not to be construed as limiting the scope of this invention in any way.

EXAMPLE 1

Utilizing the furnace shown in FIG. 1, which had a combustion zone identical to that of the furnace depicted in FIG. 2, there was introduced into combustion zone 10 air preheated to a temperature of 1150° F. (621° C.) at a rate of 100 kscfh (0.746 Nm³/sec) and natural gas at a rate of 3.01 kscfh (0.0225 Nm³/sec). A stream of hot combustion gases were generated therefrom at a 363% primary combustion flowing in a downstream direction at a high velocity. The gauge pressure within combustion zone 10 was about 5 inches (127 mm) of mercury.

The feedstock was preheated to 400° F. (204° C.) and injected radially inwardly in the form of non-preatomized coherent streams into the hot combustion gas stream through 4 orifices 21 at the mid-point of transition zone 13. An aqueous solution of potassium was added to the hot combustion gas stream at a rate of 1.1 grams of potassium per hour. The amount of potassium which was added did not substantially decrease the structure level of the black. Transition zone 13 has a length of about 8 inches (20 cm) and an internal cross-sectional area of 22 square inches (142 cm²). orifices 21, each being 0.055 inches (1.40 mm) in diameter, were radially oriented and spaced equiangularly in a single plane about the circumference of wall 17 of transition zone 13. The feedstock was injected at a rate of 183 gph (693 L/h). The pressure applied at each point of feedstock injection was about 168 psig (1159 kPa). The liquid hydrocarbon feedstock used in the present example had the following analytical properties.

| Hydrogen | (Wt. %) | 7.71 |
| --- | --- | --- |
| Carbon | (Wt. %) | 90.5 |
| Sulfur | (Wt. %) | 1.4 |
| API Gravity 15.6/15.6° C.(60° F.) | | −1.6 |
| Spec. Gravity 15.6/15.6° C.(60° F.) | | 1.089 |
| Viscosity, SUS @54.4° C.(130° F.) | | 280 |
| Viscosity, SUS @98.9° C.(210° F.) | | 50.5 |
| BMCI (Visc-Grav) | | 130 |

Transition zone 13 expanded out to form reaction zone 31 which was surrounded by refractory and was comprised of two sections, an upstream section which had an internal cross-sectional area of 93.3 square inches (602 cm²) and a length of 5.5 feet (1.7 m); and a downstream section which had an internal cross-sectional area of 143 square inches (923 cm²).

The process was carried out such that the overall combustion was 32.2%. Quench nozzle 41 was located at a point about 6 feet (1.8 m) downstream from the downstream end 14 of transition zone 13.

The analytical properties of the black are reported in Table II and the physical properties of the rubber compounds containing the black are shown in Tables III and IV.

The present example was a control run in that a throat zone, as is present in the furnace shown in FIG. 2 and utilized in Example 2, was not present.

EXAMPLE 2

Utilizing the furnace shown in FIG. 2, there was introduced into combustion zone 10 air preheated to a temperature of 1150° F. (621° C.) at a rate of 100 kscfh (0.746 Nm³/sec) and natural gas at a rate of 3.01 kscfh (0.0225 Nm³/sec). A stream of hot combustion gases were generated therefrom at a 363% primary combustion flowing in a downstream direction at a high velocity. The gauge pressure within combustion zone 10 was about 22.8 inches (579 mm) of mercury.

The feedstock was preheated to 400° F. (204° C.) and injected radially inwardly in the form of non-preatomized coherent streams into the hot combustion gas stream through 4 orifices 21 at the mid-point of transition zone 13. Transition zone 13 has a length of about 8 inches (20 cm) and an internal cross-sectional area of 22 square inches (142 cm²). Orifices 21 were radially oriented, each 0.067 inches (1.70 mm) in diameter and spaced equiangularly in a single plane about the circumference of wall 17 of transition zone 13. The feedstock was injected at a rate of 175 gph (662 L/h). The pressure applied at each point of feedstock injection was about 85 psig (586 kPa). The liquid hydrocarbon feedstock used in the present example was the same as that used in Example 1. No potassium was added to the hot combustion gas stream produced in the present example.

First reaction zone 31 has an internal cross-sectional area of 28.3 square inches (182 cm$^2$) and a length of 15.5 inches (39.4 cm). The ratio of the internal cross-sectional area of first reaction zone 31 to that of transition zone 13 is 1.28. Throat zone 33 has an internal cross-sectional area of 12.6 square inches (81 cm$^2$) and a length of 7.2 inches (18.3 cm). The ratio of the interior cross-sectional area of throat zone 33 to that of transition zone 13 is 0.57. Wall 39 defines second reaction zone 35 which is comprised of two sections; the upstream section of second reaction zone 35 has an internal cross-sectional area of 63.6 square inches (410 cm$^2$) and a length of 39 inches (99 cm), and the downstream section has an internal cross-sectional area of 143 square inches (923 cm$^2$). The ratio of the cross-sectional area of the upstream section of second reaction zone 35 to that of transition zone 13 is 2.9; and the ratio of the cross-sectional area of the downstream section of second reaction zone 35 to that of transition zone 13 is 6.5.

The process was carried out such that the overall combustion was 33.3%. Quench nozzle 41 was located at a point about 6 feet (1.8 m) downstream from downstream end 14 of transition zone 13.

The analytical properties of the black are reported in Table II and the physical properties of the rubber compounds containing the black are shown in Tables III and IV.

A comparison of Examples 1 and 2 reveals that the utilization of the process of the present invention results in the production of a carbon black which for a given surface area as, for example, reflected by the Iodine adsorption numbers of the black, has a substantially increased level of structure as reflected by DBP and CDBP measurements. Furthermore, the black produced by the present invention is characterized by reduced tinting strength.

It is further observed that when the blocks produced by the processes of Examples 1 and 2 are incorporated into natural and synthetic rubber formulations, the rubber compounds containing the black of the process of the present invention have increased modulus and higher rebound values.

EXAMPLE 3

Carbon black was produced in accordance with the procedure and apparatus shown in Example 1 with the following exceptions. The combustion air was preheated to 890° F. (477° C.). The natural gas was introduced at a rate of 5.78 kscfh (0.0431 Nm$^3$/sec). A stream of hot combustion gases was generated at a 189% primary combustion flowing in a downstream direction at a high velocity. The gauge pressure within combustion zone 10 was about 5.4 inches (137 mm) of mercury.

Orifices 21 were 0.0465 inches (1.18 mm) in diameter. The feedstock was injected at a rate of 177 gph (670 L/h). The pressure applied at each point of feedstock injection was about 275 psig (1198 kPa). No potassium was added to the combustion gas stream.

The process was carried out such that the overall combustion was 30.5%. Quench nozzle 41 was located at a point about 10 feet (3 m) downstream from the downstream end 14 of transition zone 13.

The analytical properties of the black are reported in Table V and the physical properties of the rubber compounds containing the black are shown in Tables VI and VII.

EXAMPLE 4

Carbon black was produced in accordance with the procedure and apparatus shown in Example 2 with the following exceptions. The combustion air was preheated to 900° F. (482° C.). The natural gas was introduced at a rate of 5.78 kscfh (0.0431 Nm$^3$/sec). A stream of hot combustion gases was generated at a 189% primary combustion flowing in a downstream direction at a high velocity. The gauge pressure within combustion zone 10 was about 22 inches (559 mm) of mercury.

Orifices 21 were 0.0635 inches (1.61 mm) in diameter. The feedstock was injected at a rate of 170 gph (643 L/h). The pressure applied at each point of feedstock injection was about 100 psig (690 kPa). No potassium was added to the hot combustion gases.

The process was carried out such that the overall combustion was 31.6%. Quench nozzle 41 was located at a point about 10 feet (3 m) downstream from the downstream end 14 of transition zone 13.

The analytical properties of the black are reported in Table V and the physical properties of the rubber compounds containing the black are shown in Tables VI and VII.

A comparison of the data of the carbon blacks produced in Examples 3 and 4 reveals that the effects produced in Examples 3 and 4 are substantially similar to those observed in the comparison of Examples 1 and 2 obtained when utilizing a substantially lower primary combustion.

TABLE II

| ANALYTICAL PROPERTIES | | |
|---|---|---|
| Property | Example 1 | Example 2 |
| Tinting Strength % | 112 | 107 |
| Iodine No. mg I$_2$/g black | 99 | 100 |
| DBP Absorption Pellets cc/100 g | 121 | 170 |
| CDBP (24M4) cc/100 g | 104 | 124 |

TABLE III

| Physical Properties of Natural Rubber Vulcanizates | | |
|---|---|---|
| Property | Example 1* | Example 2* |
| 300% Modulus, 15 minutes | | |
| M Pa | +1.19 | +3.01 |
| p.s.i. | +170 | +430 |
| 300% Modulus, 30 minutes | | |
| M Pa | +1.68 | +3.15 |
| p.s.i. | +240 | +450 |
| Tensile, 30 minutes | | |
| M Pa | +0.56 | −2.06 |
| p.s.i. | +80 | −295 |
| Rebound, 60 minutes (%) | −5.3 | −2.7 |

*The data are given relative to IRB No.5.

TABLE IV

| Physical Properties of Synthetic Rubber Vulcanizates | | |
|---|---|---|
| Property | Example 1* | Example 2* |
| 300% Modulus, 35 minutes | | |
| M Pa | +0.63 | +3.08 |
| p.s.i. | +90 | +440 |

TABLE IV-continued
Physical Properties of Synthetic Rubber Vulcanizates

| Property | Example 1* | Example 2* |
|---|---|---|
| 300% Modulus, 50 minutes | | |
| M Pa | +2.24 | +4.27 |
| p.s.i. | +320 | +610 |
| Tensile, 50 minutes | | |
| M Pa | −0.17 | −0.45 |
| p.s.i. | −25 | −65 |
| Rebound, 60 minutes (%) | −3.6 | −2.1 |

*The data are given relative to IRB No.5.

TABLE V
ANALYTICAL PROPERTIES

| Property | Example 3 | Example 4 |
|---|---|---|
| Tinting Strength % | 110 | 98 |
| Iodine No. mg I$_2$/g black | 85 | 83 |
| DBP Absorption Pellets cc/100 g | 134 | 163 |
| CDBP (24M4) cc/100 g | 102 | 111 |

TABLE VI
Physical Properties of Natural Rubber Vulcanizates

| Property | Example 3* | Example 4* |
|---|---|---|
| 300% Modulus, 15 minutes | | |
| M Pa | +2.87 | +4.48 |
| p.s.i. | +410 | +640 |
| 300% Modulus, 30 minutes | | |
| M Pa | +2.80 | +4.20 |
| p.s.i. | +400 | +600 |
| Tensile, 30 minutes | | |
| M Pa | −0.56 | −1.89 |
| p.s.i. | −80 | −270 |
| Rebound, 60 minutes (%) | −3.2 | −2.2 |

*The data are given relative to IRB No.5.

TABLE VII
Physical Properties of Synthetic Rubber Vulcanizates

| Property | Example 3* | Example 4* |
|---|---|---|
| 300% Modulus, 35 minutes | | |
| M Pa | +3.53 | +4.69 |
| p.s.i. | +505 | +670 |
| 300% Modulus, 50 minutes | | |
| M Pa | +3.11 | +4.44 |
| p.s.i. | +445 | +635 |
| Tensile, 50 minutes | | |
| M Pa | +0.66 | −0.10 |
| p.s.i. | +95 | −15 |
| Rebound, 60 minutes (%) | −1.5 | −1.5 |

*The data are given relative to IRB No.5.

While the present invention has been described with respect to certain embodiments, it is not so limited, and it should be understood that variations and modifications thereof may be made which are obvious to those skilled in the art without departing from the spirit of the invention.

The embodiments of the invention in which an exclusive property or privilege is claimed are defined as follows:

1. A process for producing carbon black comprising introducing a fuel and oxidant into a combustion zone at a rate sufficient to produce a gauge pressure within the combustion zone of at least 2.0 inches (51 mm) of mercury;

reacting the fuel and the oxidant so as to provide a stream of hot combustion gases possessing sufficient energy to convert a carbon blackyielding hydrocarbon feedstock to carbon black;

injecting hydrocarbon feedstock into the stream of hot combustion gases axially or substantially radially relative to the direction of the flow of the hot combustion gas stream under sufficient pressure to achieve penetration and mixing of the feedstock;

flowing the stream of hot combustion gases containing the feedstock through a transition zone and into a first reaction zone having an internal cross-sectional area larger than the internal cross-sectional area of the transition zone;

flowing the stream of hot combustion gases containing the feedstock out of the first reaction zone and into a throat zone having an internal cross-sectional area smaller than the internal cross-sectional area of the transition zone;

flowing the stream of hot combustion gases containing the feedstock out of the throat zone and into a second reaction zone having an internal cross-sectional area larger than the internal cross sectional area of the throat zone;

quenching the stream of hot combustion gases containing carbon black; and cooling, separating and collecting the resultant carbon black.

2. A process for producing carbon black as recited in claim 1 wherein
the gauge pressure within the combustion zone is at least 6.0 inches (152 mm) of mercury.

3. A process for producing carbon black as recited in claim 1 wherein
the gauge pressure within the combustion zone is at least 10.0 inches (254 mm) of mercury.

4. A process for producing carbon black as recited in claim 1 wherein
the hydrocarbon feedstock is injected from the inner or outer periphery of the stream of hot combustion gases in a direction substantially radial to the flow of the hot combustion gas stream.

5. A process for producing carbon black as recited in claim 1 wherein
the feedstock is in liquid form and is injected in the form of non-preatomized streams.

6. A process for producing carbon black as recited in claim 1 wherein
the ratio of the internal cross-sectional area of the first reaction zone to the internal cross-sectional area of the transition zone is between about 1.1 and 4.0.

7. A process for producing carbon black as recited in claim 1 wherein
the ratio of the internal cross-sectional area of the throat zone to the internal cross-sectional area of the transition zone is between about 0.25 and 0.9.

8. A process for producing carbon black as recited in claim 1 wherein
the ratio of the internal cross-sectional area of the second reaction zone to the internal cross-sectional area of the transition zone is between about 1.1 and 16.

9. A process for producing carbon black as recited in claim 1 wherein
the gauge pressure within the combustion zone is at least 6.0 inches (152 mm) of mercury and the hydrocarbon feedstock is a liquid and is injected in the form of non-preatomized streams from the outer periphery of the stream of hot combustion gases inwardly in a direction substantially radial to the flow of the hot combustion gas stream.

10. A process for producing carbon black as recited in claim 9 wherein
the gauge pressure within the combustion zone is at least 10.0 inches (254 mm) of mercury.

* * * * *